(12) United States Patent
Anders, III

(10) Patent No.: US 6,684,552 B1
(45) Date of Patent: Feb. 3, 2004

(54) TURKEY DECOY

(76) Inventor: Otto A. Anders, III, 115 Brookside La., Piedmont, SC (US) 29673

( * ) Notice: Subject to any disclaimer, the term of this patent is extended or adjusted under 35 U.S.C. 154(b) by 0 days.

(21) Appl. No.: 10/242,103

(22) Filed: Sep. 12, 2002

(51) Int. Cl.[7] .............................................. A01M 31/06
(52) U.S. Cl. ..................................................... 43/3; 43/2
(58) Field of Search ........................ 43/2, 3; 446/154, 446/156, 158

(56) References Cited

U.S. PATENT DOCUMENTS

| | | | | |
|---|---|---|---|---|
| 2,035,308 A | * | 3/1936 | Ferber .......................... 446/158 |
| 2,194,537 A | | 3/1940 | Adams .......................... 46/152 |
| 2,366,576 A | | 1/1945 | Thomas .......................... 46/150 |
| 2,421,279 A | | 5/1947 | Marty .......................... 46/126 |
| 2,455,430 A | | 12/1948 | Luckhaupt .................... 46/119 |
| 2,799,960 A | * | 7/1957 | Riley .............................. 43/3 |
| 3,350,808 A | * | 11/1967 | Mitchell .......................... 43/3 |
| 3,490,172 A | * | 1/1970 | Schartz ........................ 446/298 |
| 3,916,553 A | * | 11/1975 | Lynch et al. ..................... 43/3 |
| 4,143,484 A | * | 3/1979 | Yonezawa .................... 446/278 |
| 4,680,022 A | | 7/1987 | Hoshino et al. ............. 446/487 |
| 4,703,892 A | | 11/1987 | Nadel .......................... 239/211 |
| 4,813,670 A | | 3/1989 | Mizunuma ................ 273/1 GG |
| 4,965,953 A | * | 10/1990 | McKinney ....................... 43/2 |
| 5,036,614 A | * | 8/1991 | Jackson .......................... 43/3 |
| 5,168,649 A | * | 12/1992 | Wright .............................. 43/2 |
| 5,274,942 A | * | 1/1994 | Lanius .............................. 43/2 |
| 5,279,063 A | * | 1/1994 | Heiges .............................. 43/3 |
| 5,289,654 A | * | 3/1994 | Denny et al. ..................... 43/2 |
| 5,613,317 A | * | 3/1997 | Ninegar .......................... 43/3 |
| 5,636,466 A | * | 6/1997 | Davis .............................. 43/3 |
| 5,964,055 A | * | 10/1999 | Smith .............................. 43/3 |
| 6,092,322 A | * | 7/2000 | Samaras .......................... 43/2 |
| 6,212,816 B1 | * | 4/2001 | Babbitt .......................... 43/3 |
| 6,244,924 B1 | | 6/2001 | Liu .............................. 446/352 |
| 2002/0178639 A1 | * | 12/2002 | Daniels .......................... 43/3 |

* cited by examiner

*Primary Examiner*—Kurt Rowan
*Assistant Examiner*—Susan Piascik
(74) *Attorney, Agent, or Firm*—McNair Law Firm, P.A.

(57) ABSTRACT

An animated game decoy which is remotely acutated to simulate normal body activity of the game when feeding. The decoy is driven to move through an alert position, a half alert position and feeding movements.

17 Claims, 4 Drawing Sheets

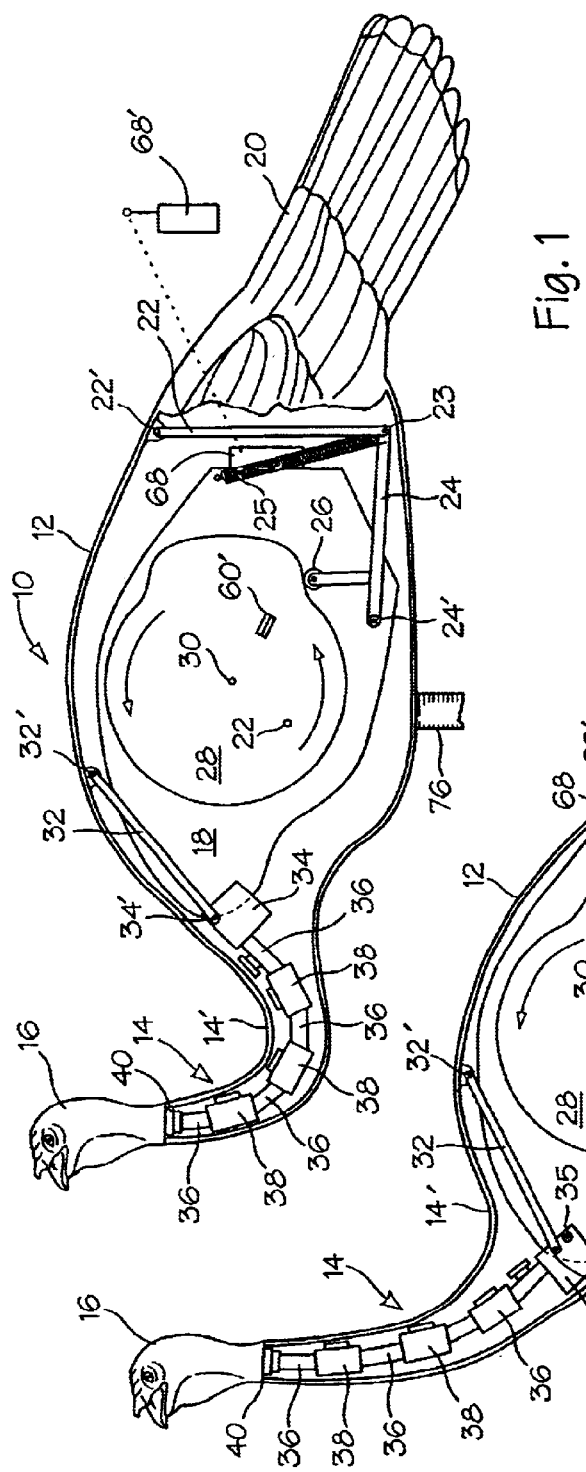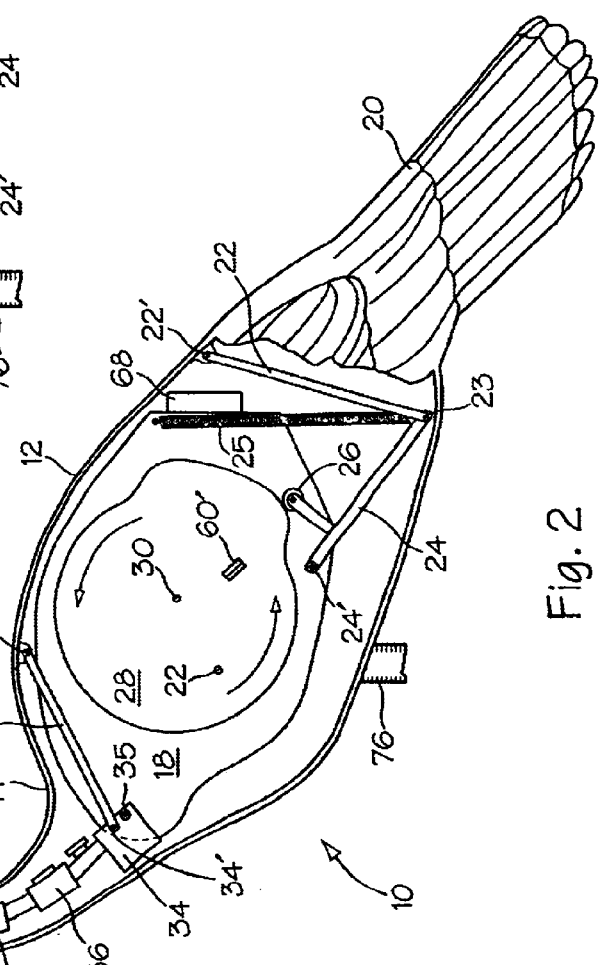

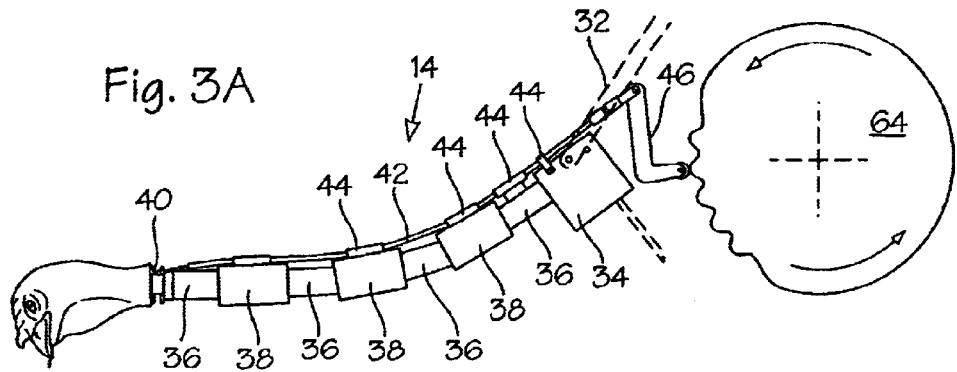
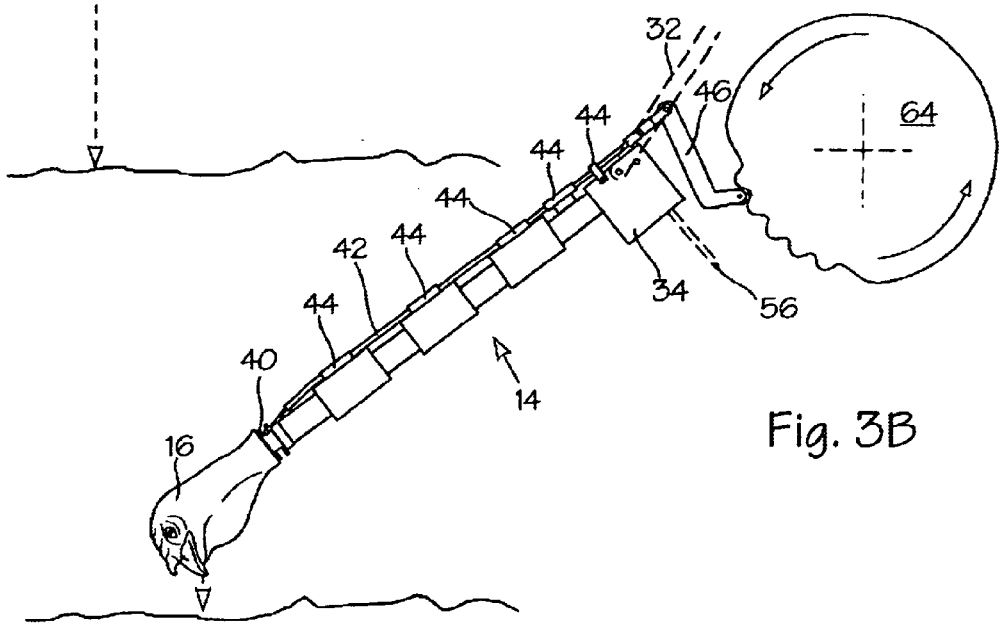
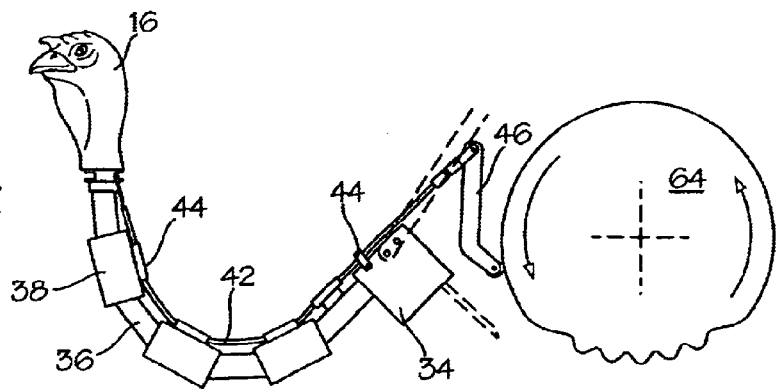

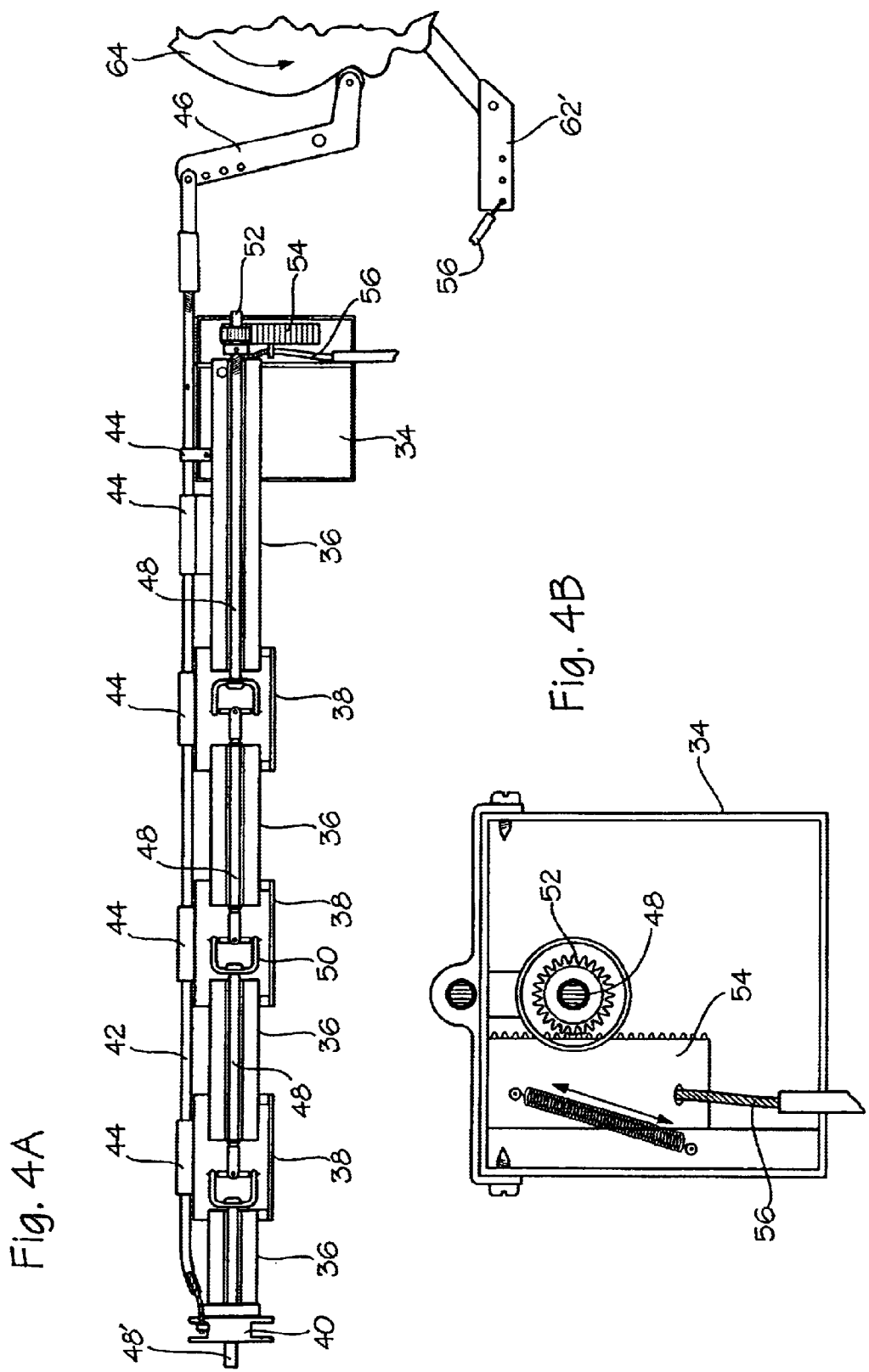

TURKEY DECOY

BACKGROUND OF THE INVENTION

This invention relates to a game decoy and more particularly to a bird decoy capable of imitating movements of the bird when feeding.

Decoys are old and well known to hunters. Generally, decoys simply are non-movable objects, which have the appearance of the game being hunted. In sue they are simply placed in stationary positions in an attempt to attract the game.

The instant invention has as its object a game decoy that not only has the appearance of the desired game but also is capable of simulating selected body movements of that game.

Another object of the invention is an animated game decoy, which is selectively actuated into movement, which simulates the movements of the game.

Another object of the invention is an animated game decoy.

Another object of the invention is an animated game decoy driven by an electric motor, which is remotely controlled.

Another object of the invention is an animated game decoy with cam driven movements.

Another object of the invention is an animated turkey decoy with a neck movable in a serpentine reciprocatory path.

Another object of the invention is the provision of an animated game decoy with dependable motion drives which is inexpensive to produce.

SUMMARY OF THE INVENTION

The invention is directed to an animated game decoy, and primarily to a bird decoy. The decoy includes a stand for supporting body in position above the ground or other surface. The body is shaped in the form of game and includes a neck mounting a head.

A plurality of linkage members is associated with the body, the neck and the head. A drive is provided for providing movement of the linkage members, which in turn cause movement of the body, the neck and the head. A control is provided for selectively activating the drive so that the body can be controlled for at least rocking movement relative to the stand, the neck can be controlled for at least up and down movement relative to the body and the head can be controlled between a plurality of facing positions. Each of these movements assimilates the motions of the game keeping watch while feeding.

The linkage is also capable of moving the body rotably.

The neck is formed with at least three universal joints, which interconnect a plurality of tubes.

The joints allow serpentine movement of the neck between the head and the body. The joints also allow a rotating drive to connect with the head.

The drive includes an electric motor, which rotates a plurality of cams. The cams drive the linkage to move the elected parts as desired. A remote control actuator is provided to selectively turn the motor on and off.

A decoy resembling a bird comprising a body, which includes a neck mounting a head. The neck and head are capable of independent movement relative to the body.

A box carried on a stand is provided for supporting the body, neck and head. The box is notably mounted with the stand in a horizontally'stable manner. The box is designed to house a drive. Linkage members interconnect between the drive, the neck, the head and the body. A control is provided which is operative to selectively actuate the drive which in turn controls the linkage to cause movement of the head relative to the neck, the body and the box, movement of the neck relative to the body and the box and movement of the body relative to the box.

The movement of the neck is serpentine along a vertical plane. The movement of the body relative to the box is pivotal. The movement of the head relative to the neck is rotating. The movements between the head, the neck and the body are sequential.

The linkage includes flexible rods driven by rotating cams. The cams are driven by an electric motor, which is actuated and de-actuated by a remote control.

An animated decoy in the form of a turkey. The decoy includes a body having a neck carrying a head. Linkage is provided which interconnects with the body, the neck and the head. A drive is provided for actuating the linkage so that the decoy is provided sequential movement of the body, the neck and the head.

A box is rotably mounted on a stand, and the body is pivotally mounted over the box. The neck is also pivotally mounted to the box.

The box carries drive members and a motor. The linkage is driven by the drive to move the body and the neck in a vertical rocking motion. The motion of the neck includes a serpentine motion which motions allow the neck to move the head through a feeding position, a half alert position and an alert position.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 1 is a cutaway side view of a turkey decoy of the invention shown in the half alert position;

FIG. 2 is a cutaway side view showing the turkey decoy in the alert position;

FIGS. 3A, 3B, and 3C are blown up sectional views showing the head positions of the turkey when feeding. FIG. 3A shows the head in a preparatory to feed position. FIG. 3A shows the head in the feeding position. FIG. 3C shows the head in the half alert position;

FIG. 4A is a sectional side view of the neck and neck drive;

FIG. 4B is an exploded view of the head drive mechanism; and

DESCRIPTION OF A PREFERRED EMBODIMENT

Figure 6:
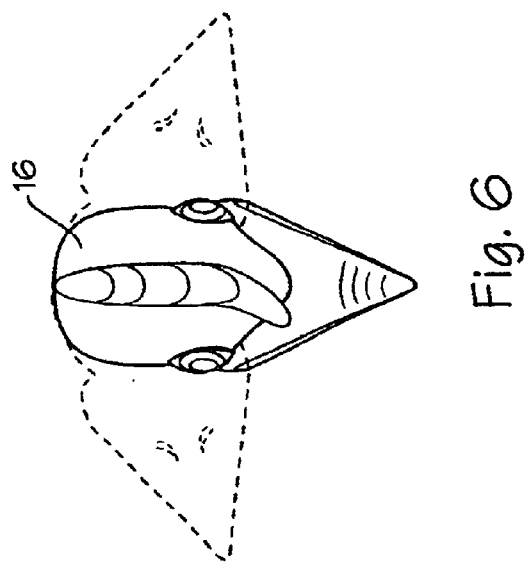
FIG. 6 is a top view of the head positions.

Referring now in more detail to the drawings, the invention will now be described in more detail.

Referring now to FIGS. 1 and 2 an animated game decoy is shown, in this case, the decoy 10 represents a turkey. Quite obviously substantially any game animal could be formed and controlled in the manner to be disclosed such as geese, ducks, rabbits, etc.

Decoy 10 includes a gear box 18 mounted on tube 76, a body 12 with a neck 14 and a head 16. Body 12 comprises a hollow molded shell which is mounted over gear box 18 so that neck and head 14, 16 extend from a forward end thereof and tail 20 extends from the opposite end. Body 12 is pivotally mounted with gear box 18 at 22.

Pivotally attached at 22' to an upper rearward portion of body 12 and to a lower portion of gear box 18 at 24' is body positioning linkage 22, 24. The linkage members are pivotally connected at 23. Member 24 carries a raised cam follower 26. Cam follower 26 is urged by spring 25 into constant engagement with cam 28. Cam 28 is carried by shaft 30 within gear box 18.

Pivotally, attached at 32' to an upper forward portion of body 12 is a rod 32 which is pivotally connected at 34' to head gear box 34. Head gear box 34 is pivotally mounted at 35 to gear box 18.

Neck 14 comprises a plurality rigid tubes 36 interconnected with flexible collars 38 and is best seen in FIGS. 1, 2, and 4A. The inner most tube 36 extends into and is connected with head gear box 34 in fixed position. The outermost tube 36 is connected with a rigid collar 40. As best seen in FIGS. 3 and 4, a flexible rod 42 is mounted along the upper side of the neck by guides 44 and is connected at one end with collar 40 and its opposite end with lever 46 which is driven by cam 64.

Neck 14 comprises a flexible outer cover which connects with body 12 at 14' and with collar 40.

Turning now to FIG. 4A, it can be seen that neck 14 carries within each tube 36, a shafts 48, each of which are interconnected with universal joints 50. The outer end 48' of outermost shaft 48 extends through collar 40 and mounts head 16. The outer end of innermost shaft 48 extends into head gear box 34 and mounts pinion 52. Pinion 52 meshes with rack 54 which is reciprocally driven by cam 62 through lever 62' and cable 56 in usual manner.

Figure 5:
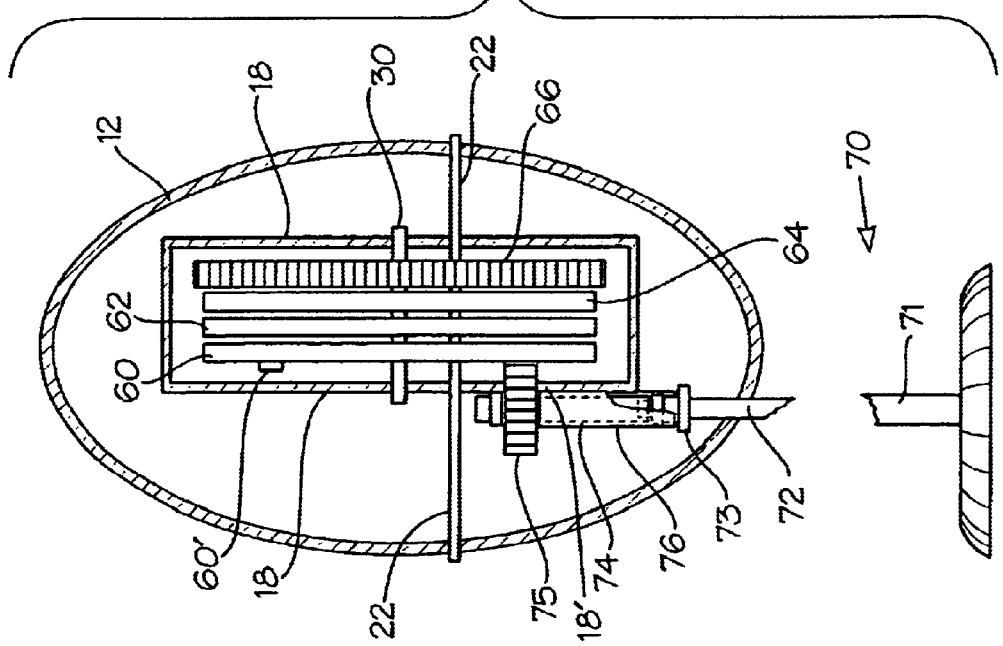
FIG. 5 is a sectional end view of the gear a box and stand for the turkey decoy.

Turning now to FIG. 5, gear box 18 is shown supported by stand 70 and carrying body control cam 60, head turn control cam 62 and neck control cam 64 along with cam drive gear 66 on shaft 30. An electric drive motor 68 is mounted on gear box 18, as illustrated in FIGS. 1 and 2, and engages with drive gear 66. Motor 68 is operated between an active and an inactive position by remote control 68' as shown in FIG. 1.

Stand 70 includes a base 71 carrying a vertical rod 72 which includes a collar 73 at its upper end. A removable rod 74 mounting pinion 75 is designed fit into the upper end of rod 74 in a stationary position.

Gear box 18 has secured to one side tube 76. Tube 76 is vertically aligned with shaft 30 and extends slightly below the bottom of gear box 18 and body 12. This arrangement allows tube 76 to be mounted over the upper end of shaft 72 with its lower edge rotably resting on collar 73. Rod 74 is inserted through tube 76 into the upper end of shaft 72 where it is held in a stationary position. Pinion 75, which is carried by shaft 72 in fixed position, is located to extend through an opening in side 18' of gear box 18 into a position adjacent body cam 60. Body cam 60 carries a tooth 60' on its outer side. Tooth 60' is positioned to engage pinion 75 on each revolution of cam 60 and impart an increment of rotational movement to gear box 18.

The turkey decoy operates through a complete cycle of movements with each revolution of shaft 30. Motor 68 can be operated by control 68' to drive shaft 30 through increments of a revolution, stopping after completion of each increment, through a single complete revolution or through a plurality of revolutions as desired. It is believed that spaced complete single revolutions are most effective and this method of operation is preferred.

In use, motor 68 is activated to rotate shaft 30 at a very slow rate. Normally head 16 and neck 15 are in the half alert position shown in FIG. 1 at the beginning of the cycle. The raised portion of cam 28 now engages follower 26 which through linkage 22, 24 and rotates body 12 about pivot 22 into the alert position as shown in FIG. 2. As body 12 moves into the raised position link 32 pulls head gear box 34 about pivot 36 which allows rod 42 to straighten which straightens neck 14.

At this point cam 62 can be configured to move lever 62', cable 56 and rack 54 to rotate shaft 48 first to the right, then back to the start position, then to the left and again back to the star position causing the head to assume a right facing position, a forward facing position, a left facing position and back to a forward facing position. See FIGS. 4A, 4B and 6.

Cam 60 returns body 12 to its normal position shown in FIG. 1 while cam 64 causes neck 14 to move into the feeding and half alert positions shown in FIGS. 3A–C. FIG. 3A shows the raised feeding position, FIG. 3B, the lowered feeding position. Repetitions between these positions causes the head and neck to simulate a pecking motion. FIG. 3C returns the neck and head to the half alert position.

Cam 62 can also be configured to oscillate the head between positions in the half alert position.

Upon completion of one revolution of shaft 30, finger 60' engages pinion 75 causing the decoy to rotate slightly, i.e., the distance between adjacent teeth of pinion 75b while the body, neck and head remain in the half alert position.

It is noted that cams 60, 62 and 64 may be shaped to vary the degree of movements, the relative timing between the various movements and the number of repetitions of any motion as desired. While the forming of the final selected shape of each cam is within the scope of one skilled in the art, it is the resulting use and movements of the decoy in which the inventive concept lies.

While a preferred embodiment of the invention has been described using specific terms, such description is for illustrative purposes only, and it is to be understood that changes and variations may be made without departing from the spirit or scope of the following claims.

What is claimed is:

1. A game decoy comprising:

a stand for supporting said decoy in position above a surface;

said decoy being shaped in the form of a desired bird to include a body mounting a neck with said neck mounting a head and including linkage members associated with said body, said neck and said head;

said neck linkage members including a plurality of elongated tubes interconnected with joints within said neck;

a drive for causing movement of said linkage members, which in turn cause selective movement of said, body, said neck and said head;

a control for selectively activating said drive, whereby;

said body can be controlled for rotary movement about said stand and a rocking movement relative to said stand, said neck can be controlled for at least up and down movement relative to said body and said head can be controlled between a plurality of facing positions, said movements assimilating the motions of a bird keeping watch while feeding.

2. The decoy of claim 1 wherein said decoy includes an outer dress, which resembles a turkey.

3. The decoy of claim 1 including a box mounted with said stand in a vertically stationary position, said box carrying said drive.

4. The decoy of claim 3 wherein said neck is pivotally connected with said box.

5. The decoy of claim 1 wherein said head is rotably mounted on an end of said neck.

6. The decoy of claim 5 wherein said linkage extending between said head, and said drive, is controlled by said drive to move said head between forward facing, right facing and left facing positions.

7. The decoy of claim 1 wherein said drive includes an electric motor and a plurality of cams rotably driven by said motor.

8. The decoy of claim 1 wherein said vertical rocking motion of said body imparts an additional vertical motion to said neck and head positioning said head between an alert and a half alert position.

9. A bird decoy comprising:
a neck mounted on said body;
a head mounted on said neck, wherein said neck and said head are capable of moving independently relative to said body;
a box carried on a stationary stand for supporting said body;
a drive means including a cam shaft carrying a plurality of cams mounted in said box and a motor driving said cam shaft mounted on said box;
linkage members connecting said cams with said body, said neck and said head;
a control operative to selectively actuate said motor; wherein,
said linkage may be controlled to cause independent, selective movement of said head, said neck, said body, relative to said box.

10. The decoy of claim 9 wherein said movement of said neck may be serpentine along a vertical plane.

11. The decoy of claim 9 wherein said movement of said body relative to said box is pivotal.

12. The decoy of claim 9 wherein said movement of said head relative to said neck is rotating.

13. The decoy of claim 9 wherein said drive means driving said decoy about said stand.

14. The decoy of claim 13 wherein said linkage includes flexible rods driven by said cams.

15. A method of controlling a game decoy including:
providing a stationary stand and rotably mounting a box carrying a plurality of drive cams and a drive motor with said stand;
providing decoy body portion and pivotally mounting said body with said box;
providing a neck with said body and providing neck linkage including a plurality of elongated tubes interconnected with joints within said neck connected with said drive cam;
providing linkage within said body interconnecting said decoy body with said cams; and
selective rotating said cams causing said neck linkage to move said neck and body linkage to move said body in a vertical rocking motion positioning said neck and body between a preparatory feeding position, a feeding position, a half alert position and an alert position.

16. The method of claim 15 including driving said body rotably about said stand.

17. The method of claim 15 including providing a head and head linkage and driving said head linkage with said cams to cause said head to move between left, right and front positions.

* * * * *